United States Patent [19]
Hayes et al.

[11] 3,870,805
[45] Mar. 11, 1975

[54] PROCESS FOR PREPARING TEXTURIZED PROTEIN COMPOSITIONS AND THE RESULTING PRODUCT

[75] Inventors: Lester P. Hayes, Decatur; John W. Robinson, Blue Mound; Ross P. Simms, Decatur; Millard E. Russell, Blue Mound, all of Ill.

[73] Assignee: A. E. Staley Manufacturing Company, Decatur, Ill.

[22] Filed: Nov. 4, 1970

[21] Appl. No.: 86,908

[52] U.S. Cl................ 426/148, 426/137, 426/212, 426/506, 426/516
[51] Int. Cl............................................. A23l 1/36
[58] Field of Search................................. 99/17, 14

[56] References Cited
UNITED STATES PATENTS
3,142,571  7/1964  McAnelly .............................. 99/14
3,480,442  11/1969  Atkinson................................ 99/17
3,488,770  1/1970  Atkinson................................ 99/17
3,496,858  2/1970  Jenkins.................................. 99/17

Primary Examiner—Raymond N. Jones
Attorney, Agent, or Firm—Charles J. Meyerson; M. Paul Hendrickson

[57] ABSTRACT

Texturized protein compositions of improved textural and organoleptic properties are prepared by longitudinally rupturing the structure of hydrated, water-insoluble protein pieces. Dry expanded extrudates prepared from defatted soybean meals are a suitable source material in providing the texturized protein compositions. By shredding the hydrated extrudate into plurality of fiberous masses and removing the water-solubles, bland tasting fiberous masses having improved meat-like properties over conventional spun filament protein products and hydrated extrudates are obtained.

25 Claims, 17 Drawing Figures

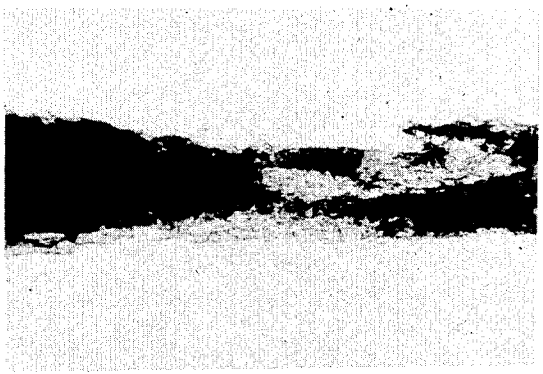
FIGURE 13
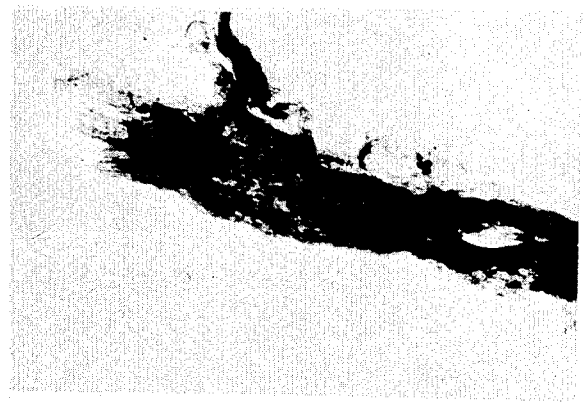
FIGURE 14
FIGURE 15

LESTER P. HAYES
JOHN W. ROBINSON
ROSS P. SIMMS
MILLARD E. RUSSELL
INVENTORS

BY ATTORNEY:
M. Paul Hendrickson

PROCESS FOR PREPARING TEXTURIZED PROTEIN COMPOSITIONS AND THE RESULTING PRODUCT

DISCLOSURE OF THE INVENTION

The present invention relates to meat-like food products and their production from various protein sources. More particularly, this invention relates to a food product, and its process of manufacture, which contains mainly protein from plant sources and has a texture and mouth feel similar to that of cooked meat.

BACKGROUND OF THE INVENTION

In recent years the search for an inexpensive and readily available meat substitute has involved the adoption of protein from various vegetable sources, in particular, protein from soybeans. The use of vegetable protein in meat products for human consumption has become increasingly wide-spread. The vegetable protein that is used for this purpose is conventionally processed in either of two ways.

One such general method, exemplified by the process of U.S. Pat. No. 2,682,466 and improvements thereon, involves the preparation of very thin strands or filaments of protein. An aqueous solution of purified, or isolated, vegetable protein is passed through a spinnerette into an acid coagulating bath. The resulting filaments are recovered and stretched, bound together, colored and flavored to produce full meat analogs, (e.g., chicken loaves, bacon strips, etc). However, this processing scheme has a number of disadvantages associated with it. This method involves complex purification and recovery processing. These factors, plus others, contribute to the high cost of the final meat analog which, in turn, eliminates one major advantage that the vegetable protein product has relative to real meat.

A second method for producing textured vegetable protein for use as a meat substitute involves cooking and extruding a vegetable protein-water mix, and is exemplified by the process taught in U.S. Pat. Nos. 3,047,395 and 3,142,571 and 3,488,770. Although the textured vegetable protein processes are less expensive that the "filament" type products, their utility as a meat substitute is limited. Such extruded textured vegetable proteins possess several inherent characteristics which have seriously limited their use as a substitute for the spun filament proteins. Unlike the spun filament protein products, the extruded vegetable proteins fail to possess a fibrous meat-like structure sufficiently comparable in character to the meat-like texture normally associated with typical meat cuts. Consequently, the prior art extruded products have been used as a partial replacement for ground meats in limited product areas such as chili, meat patties, meat loaf, stews, casseroles and the like, but not as a replacement for meat products wherein it is desired to simulate the texture of a natural meat slice such as poultry, beef, pork, sea foods and the like. Moreover, extruded textured vegetable proteins derived from crude soybean meal inherently possess objectionable flavoring and odorous components. Such objectionable components are atypical of the flavors and odors normally associated with cooked meat products. Elimination and/or masking of these adverse flavors and odors by the addition of meat flavoring agents has not been a satisfactory means of obviating this problem. In order to obviate the adverse flavor and odor problems inherent to dry expanded vegetable proteins, the art has necessarily resorted to additional processing of hexane solvent extracted soybean meals to prepare a soya protein isolate. Unfortunately, the additional processing costs incurred in preparing the soya protein isolate increases the over-all production costs to such an extent that the resultant dry expanded protein product loses its apparent cost advantage over "filament" type products. For these reasons, extruded textured vegetable proteins are not deemed suitable as a replacement for "filament" type products in the preparation of meat products, especially when it is desired to simulate a comparable texture, flavor and odor of natural cooked meat cuts.

In U.S. Pat. No. 3,142,571 by John Kitchel McAnelly there is disclosed a method for preparing bland protein concentrates from soybean flour. These bland protein concentrates are generally prepared by first forming a dough of defatted soybean flour and water. The dough is then pressure cooked with steam under conditions whereby water is continuously added during cooking to volatize the objectionable flavor components therefrom and to prevent dehydration of the dough. After cooking for a sufficient period of heat denature the protein and remove the objectionable flavor components, the pressure is released to provide a dry expanded product. The resultant expanded product is then subdivided into small pieces (e.g., by grinding) and treated with a polar solvent under conditions whereby the water solubles are leached from the cooked soybean flour. After leaching the resultant protein concentrate is rinsed, dried and further subdivided to the desired particle size.

Although the protein concentrates of U.S. Pat. No. 3,142,571 allegedly possess a bland flavor, its usefulness in preparing synthetic meat cuts simulating natural meat cuts is limited. Its limited usefulness is attributable mainly to the manner in which the protein concentrate is prepared. For example, the pressure cooking and rapid release of pressure inherently produces an expanded product possessing a nominal degree of fiberous orientation. As a result, the denatured protein inherently possess a cartilaginous texture rather than a fibrous muscle like texture. As a component in simulated ground meat products such as chili, meat loaf and the like, the lack of fibrous protein orientation is not entirely objectionable. This lack of fibrous protein orientation, however, totally destroys the basic textural and organoleptic properties essential to prepare a meat analog simulating a natural meat cut. A further inherent deficiency limiting the protein concentrates usefulness in preparing meat analogs simulating natural meat cuts results from the fact that effective leaching of water solubles therefrom necessitates subdividing of the expanded pieces into small pieces. Accordingly, the resultant leached small pieces are inherently of a ground meat character. Due to these inherent deficiencies, the protein concentrate of U.S. Pat. No. 3,142,571 are not suitable replacement for the "filament" type products.

OBJECTS

An object of the present invention is to provide texturized vegetable protein products of improved organoleptic properties and usefulness in the preparation of synthetic meat-like products.

Another object is to provide an economical method of preparing texturized protein compositions from hydrated expanded extrudates.

An additional object of the present invention is to provide a texturized protein composition of an enriched protein content and improved fiberous meat-like texture.

A further object of the invention is to provide texturized protein compositions of a predetermined fiber size and textural character and a method for preparing the same.

A still further object of the present invention is to produce a bland texturized protein composition essentially free from all undesirable flavors and odors. Additional objects of the present invention will become apparent hereinafter.

DRAWINGS

FIGS. 4, 5, 6, 7, 8, 9, 10, 11, and 12 are sequential photographs of texturized protein fibers obtained by defiberizing a slurry of hydrated extrudates in a conventional paper beater and respectively represent fibers obtained after 1, 2, 3, 4, 5, 6, 7, 8 and 10 minutes of beating.

FIGS. 13, 14 and 15 are photomicrographs of typical fibers obtained by defiberizing a slurry of hydrated extrudates in a conventional paper beater and respectively represent fibers obtained after 6, 8 and 10 minutes of beating.

Figure 16:
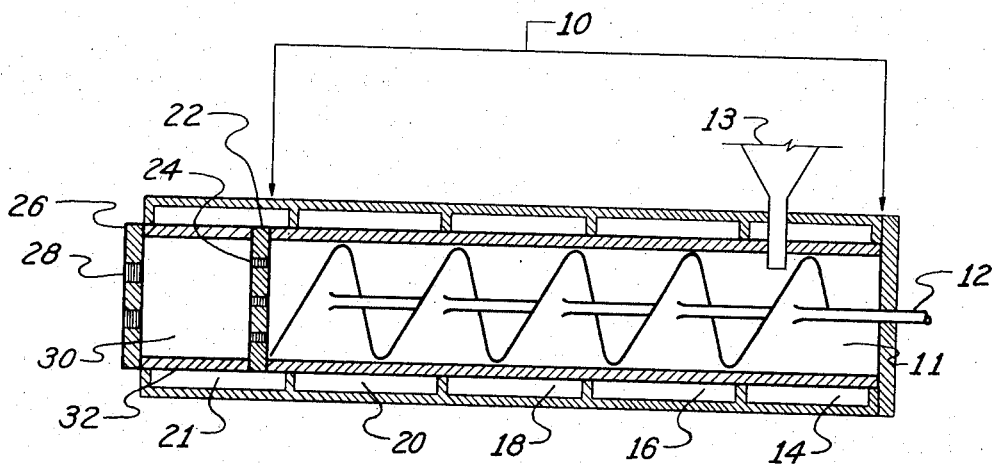

FIG. 16 represents a longitudinal cross sectional view of an extruder suitable for preparing helicoid extrudates.

Figure 17:
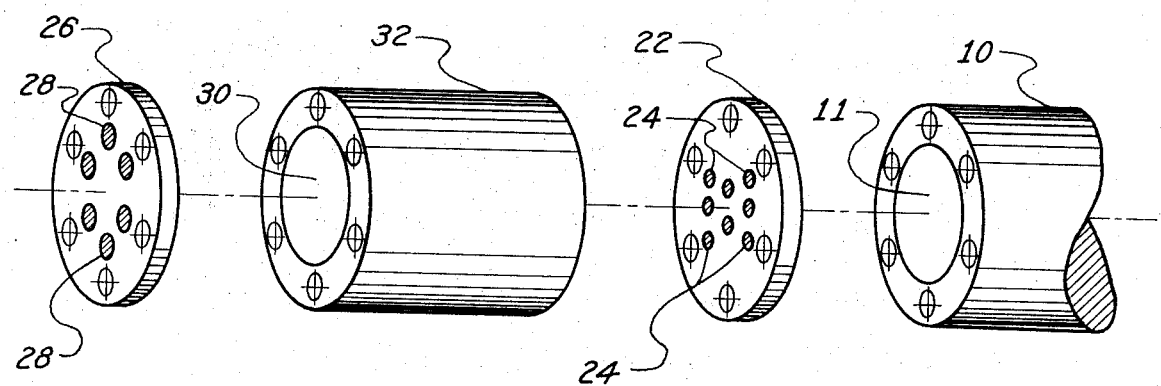

FIG. 17 represents an exploded side elevational view of the head assembly shown in FIG. 16.

DESCRIPTION OF THE INVENTION

According to the present invention there is provided a method of preparing textured protein composition of an improved meat-like texture, said method comprising the steps of:

a. providing a plurality of hydrated, pliable extrudates, characterized as containing a minor amount of water soluble carbohydrates and protein as a principle solid constituent of said extrudate, said extrudates being further characterized as individually comprising a cellular structure of a multiplicity of fibers bonded to one another, said fibers being enshrouded by a matrix of water soluble constituents and a plurality of pores and channels communicating within said matrix, the pores and channels being oriented predominantly in juxtaposition to the fibers and separated from one another by cellular walls comprised of said fibers and a matrix of water soluble constituents, b. collapsing the cellular structure of the hydrated extrudate by subjecting the hydrated extrudate to a sufficient amount of force to collapse the cellular walls of said extrudate and thereby provide a texturized protein composition.

In a more limited aspect of the invention, there is provided a process for preparing texturized protein compositions essentially free from undesirable flavors and odors. These bland texturized protein compositions are prepared by a process which includes the additional step of solubilizing and removing at least a major portion (on a dry weight basis) of the water-soluble constituents from the hydrated extrudate. Solubilization of the water soluble constituents is generally accomplished by dissolving the water-soluble constituents from the cellular walls via the communicating pores and channels of the extrudate with an aqueous medium to provide a protein enriched extrudate and an aqueous miscella of water-soluble constituents. The aqueous miscella is then separated from the extrudate solids to provide a protein enriched extrudate product with at least a major portion of the water-soluble constituents initially therein being removed. Separation of the water-soluble constituents of the dissolved solubles from the resultant extrudate solids can be accomplished at any time after hydration of the dry expanded extrudates.

Pursuant to the present invention, there are provided fiberous proteinaceous materials which have a greater utility as a meat analog ingredient when compared to spun filamenteous proteins such as diclosed in U.S. Pat. No. 2,682,466 by Boyer and conventional hydrated extrudates. The present process obviates the costly processing steps necessary to prepare the filamenteous proteins. In the present process, the cellular structure of hydrated extrudate is altered to such an extent that the resultant texturized protein composition possess a unique textural character. The process is particularly adapted to the utilization of relatively inexpensive raw materials (e.g., defatted soybean meal). As a result, the process of the present invention retains the cost advantage of conventional dry expanded extrudates while obviating the inherent product disadvantages thereof. The present invention also provides a process whereby the objectionable flavor and odorous components characteristics of the prior art extrudates can be easily removed therefrom to provide a product substantially bland in odor and flavor. Thus, in meat analogs wherein it is impossible to mask the adverse flavors and odors, the products prepared by the present invention are particularly useful. The process permits the production of fibrous proteins of a predetermined size and shape (e.g., the diameter and length of fibers can be predetermined and controlled by processing conditions) while altering, controlling and improving the textural characteristics of hydrated extrudates. Accordingly, meat analogs simulating a wide variety of natural meat cuts can be easily prepared by employing the appropriate texturized protein composition to achieve the desired organoleptic and textural properties of the meat analog.

CHARACTER OF THE DRY EXPANDED EXTRUDATES

In preparing the textured protein compositions of the present invention, the character and nature of the expanded extrudate employed has a pronounced effect upon the textural and organoleptic properties of the resultant processed product. The dry expanded extrudates employed in the present process are characterized as possessing a relatively high degree of protein orientation or fiberous structure in contradistinction to a random and non-fiberous structure such as disclosed in U.S. Pat. No. 3,142,571. The extrudates employed herein are also characterized as being comprised of a plurality of heat-denatured protein fibers, a matrix of water-soluble constituents separating and enshrouding the fibers and a plurality of pores and channels communicating within the matrix of water-soluble constituents with the pores and channels being separated by cell walls comprised of the matrix of water-soluble constituents and denatured protein fibers (i.e., water-insoluble protein).

The quantum and character (e.g., total void volume, distribution and number of cells within the extrudate) of the pores and channels within the extrudate is an important factor in providing a protein composition possessing an improved meat-like texture. From a functionality standpoint, the pores and channels are significant contributing factors in achieving:

a. a uniformly rapidly hydratable extrudate without commutating or destroying the prerequisite fiberous structure;

b. an effective means of solubilizing and removing the water-soluble consituents without destroying the fiberous protein structure;

c. a hydrated extrudate wherein its cellular structure can be effectively ruptured and thereby texturized; and d. a means of providing the fiberous character of a hydrated extrudate which can then be altered to the appropriate textural character.

The expanded extrudates employed herein are prepared under extrusion process conditions whereby the appropriate porosity, hydration, water-soluble extraction characteristics as well as fiberous orientation of the resultant proteinaceous extrudate are achieved. Under the appropriate extrusion process conditions, the extrudates are generally prepared by orientating a proteinaceous material of a proper composition and water content in an extruder at elevated temperatures and pressure. Prior to orientation (e.g., by working) the proteinaceous material and water is generally characterized as a matrix containing a continuous external phase of water-soluble constituents and a discontinuous internal phase of minute clusters or aggregates of proteinaceous material dispersed within the external phase. During the orientation of the proteinaceous material, the protein clusters or aggregates are rearranged and cleaved with a concomitant realignment and reassociation of the protein molecules as a plurality of fibrils which collectively provide a fibrous mass. The internal phase of minute aggregates of proteinaceous material under the appropriate processing conditions is thus transformed into a plurality of continuous proteinaceous fibers (e.g., bundle of fibrils) separated and enshrouded by a matrix of water and water-soluble constituents. After appropriate processing conditions, fluidity of the resultant proteinaceous material and water is substantially reduced due to the reassociation and formation of the plurality of elongated fibers therein. Upon achievement of the proper orientation the product is extruded through an extrusion orifice into a drying zone maintained at relatively low pressure and temperature (e.g., at ambient temperature and pressures). The excess water within the extruded product under such conditions becomes highly volatile (as steam) with a concomitant rapid expansion and dehydration of the resultant extrudate. Because the protein fibers possess a relatively high degree of resistance to gas penetration, the steam escapes primarily through the relatively fluid mass of water-soluble constituents within the extrudate. This results in network of communicating pores and channels within the matrix of water-soluble constituents. By varying the extrusion conditions and extrudate composition (e.g., work, temperature and pressure, extrudate composition and feed rate) extrudates of an appropriate fiber structure and porosity are prepared.

The proteinaceous materials employed in preparing the expanded extrudates can be any denaturable protein derived from both vegetable and animal sources. Illustrative denaturable proteins include albumins (e.g., serum albumin, ovalalbumin, lactoalbumin and the like), globulins (e.g., proteins from seeds and nuts), prolamines (like zein from corn), glutelins, scleroproteins such as the albuminoids, nucleoproteins, the glycoproteins, the phosphoproteins, chromoproteins, lecithoproteins, lipoproteins and proteins derived from microbial and other ferments, mixtures thereal and the like. In the present invention the extrudates contain (on a dry weight basis), as a principle ingredient, protein (e.g., about 30% or more by weight of water-insoluble protein) and a minor amount of water-soluble carbohydrate constituents (e.g., about 67% by weight or more). Illustrative proteinaceous materials suitable in practicing the present invention are flours obtained by the solvent extraction of oils from seeds such as peanuts, cottonseed, soybeans, sesame, safflower, sunflower and the like. Extrudates prepared from defatted soybean meals (e.g., conventional hexane extracted soyben flakes) are particularly adapted to the present invention. On a dry solids weight basis such defatted soybean and seed meals are generally comprised of about 10 to about 20% water soluble constituents, about 40 to about 60% heat denaturable soybean protein, a fiber content of about 2 to about 5% and a residual lipid content ranging from about 0.5 to about 5% by weight but usually less than 1%. The water-soluble constituents of soybean meals are primarily composed of polysaccharides or di-, tri- and tetrasaccharide sugars (e.g., a stachyose, raffinose and sucrose). In addition to the polysaccharides, the water soluble constituents portion contains glucosides such as the sterol glucosides, isoflavone glucosides and saponins (a bitter tasting component); organic phosphorus compounds (e.g., phytin); organic acids; water-soluble pigments and other water soluble constituents in minor amounts.

It has been found that the length of the expanded extrudates initially employed in preparing the texturized protein composition of the invention can be utilized as an effective means of controlling the textural character and fiber length of the resultant product. In general, the process employs relatively large chunks or pieces of the extrudate as opposed to granulated or small extrudate pieces. In preparing the texturized protein compositions herein, a major portion of the extrudate (on a weight basis) will normally have an extrudate length of about 5 millimeters or more. As applied herein, the extrudate refers to its length as measured in a plane parallel to the direction the extrudate is formed (i.e., along its longitudinal axis). The terms cross-sectional diameter (i.e., lateral axis diameter) herein refers to the diameter of extrudate in a plane normal to the length of the extrudate. The maximum length of the dry expanded extrudates hydrated herein can vary considerably with greater processing ease as well as improved texturized protein compositions being obtained when the average maximum length of the extrudate is less than about 300mm. Significantly improved texturized protein compositions and processing effeciency are achieved by hydrating at least a major portion (on a weight basis) of dry expanded extrudates having a length ranging from a minimum length of about 10 mm. and a maximum length of about 100.0 mm.

The cross-sectional diameter of the dry expanded extrudate hydrated pursuant to the present invention is generally not a significant factor in providing the texturized protein composition. The cross-sectional diameter of the extrudate can vary considerably with the desired size thereof being effectively controlled by subsequent processing conditions more fully described hereafter. In order to increase both processing efficiency and yields, dry expanded extrudate in which at least a major portion (on a weight basis) of the extrudates have an average cross-section dimension ranging from at least 5 mm, to about 100 mm. are employed, with those of about 10.0 mm. to about 50 mm. being generally preferred. The cross-sectional dimension of the extrudate employed herein primarily depends upon the extrusion die orifice size and shape whereas the length of the extrudate can be controlled by a conventional cutting means which cuts the expanded extrudate to the appropriate length.

HYDRATION OF THE EXTRUDATES

In preparing the textured protein compositions, the expanded extrudates are hydrated with water (e.g., by equilibrating the extrudate to its water absorption capacity and thereby uniformly hydrating the extrudate). Processing efficiency and improved textural protein compositions are achieved when the amount of water not only hydrates the extrudate but also a significant portion of the water soluble constituents therein are solubilized and extracted therefrom. An extrudate solids to water weight ratio of at least 5:1 is normally sufficient to hydrate and solubilize a significant portion of the water-soluble constituents. Both the hydration and solubilization of the water-soluble constituents is facilitated by employing an aqueous medium maintained at elevated temperatures (e.g., 160°F. to 212°F.). The preferred solids to water ratio in hydrating and extracting the water-soluble constituents from the extrudate ranges from about 5:1 to about 20:1.

EXTRACTION OF WATER-SOLUBLE CONSTITUENTS

In the hydrated form, the extrudates are a pliable resilient mass with a somewhat meat-like texture. If a relatively small amount of water is employed in hydrating a dry expanded extrudate, a significant portion of the matrix of water-soluble constituents are left intact in the enshrouding matrix. In the presence of excess water, the water penetrates the plurality of communicating pores in juxtaposition to the fibers of the extrudate and extracts the water-soluble constituents from the matrix. With the extraction of the water-soluble constituents from the extrudate, the interstitial spaces between the fibers increase both in length, shape and size. Extraction of the water-soluble constituents from the extrudate provides a hydrated product of a substantially open cellular structure.

The amount of time necessary to solubilize and remove water-soluble constituents from the hydrated extrudate, will depend upon processing conditions such as the temperature at which the treatment is conducted, the solvent used, the extraction conditions and the amount of water-solubles initially present in the extrudate solids. When it is desired to extract the water-soluble consituents before collapsing its cellular structure or reducing its cross-sectional diameter, the extraction of water-solubles is advantageously conducted in multi-stages, employing solvents progressively containing a lesser amount of water-solubles than the preceding solvent extraction medium. In general solvent extraction steps employing two or three extraction mediums containing progressively less water-soluble constituents than the previous extraction stage is sufficient to remove the water-soluble constituents. A multi-stage counter-current extraction step is particularly suitable since comparative to a single extraction stage it removes soluble material more efficiently and yields a concentrated aqueous miscella from which the solubles can be recovered more economically.

In the presence of water in excess of that necessary to hydrate the extrudate, the excess of water effectively solubilizes and removes the water-soluble constituents from the extrudate and provides a product having a significantly higher protein concentration on a solids basis than the unprocessed dry extrudate. Typical solutes found in the resultant aqueous miscella during extraction therof are the di-, tri-, and tetrasaccharide sugars (e.g., stachyose, raffinose, and sucrose); glucosides such as the phytosterola (sterol glucosides), the saponins and isoflavone glucosides; organic phosphorous compounds (phytin);; organic acids, water-soluble pigments and other constituents in minor amounts removable therefrom under the extraction conditions. Polysaccharides having two or more saccharides are the principle extracts removed from the extrudate by the extraction process. The constituents removed via the extraction process herein provide an enriched protein composition having a much greater usefulness than extrudates wherein such solubles have not been removed. The extraction of solubles effectively removes objectionable flavor and odorous components from the extrudate to provide a substantially bland product. The resultant bland products are particularly useful in preparing meat analogs wherein due to flavor considerations it is impossible to mask or eliminate the adverse flavors normally associated with conventional hydrated extrudates prepared from soybean flour compositions. Removal of the water-soluble constituents also provides products possessing improved properties in respect to absorption and fixation of various other additives or food adjuncts necessary to prepare a desired meat analog. For example, modification and fixation of other proteinaceous materials (e.g., like egg albumin, wheat gluten and the like) to the fibrous protein in preparing the desired finished meat analog is significantly enhanced because the residual protein is porous and relatively free from water-soluble consituents. This creates a more meat-like texture and better bonding of desired additives to the protein fibers. Likewise, the resultant porous fibers are more receptive to flavoring and coloring agents than protein fibers occluded with water-soluble constituents. Similarly, the removal of water-solubles, including pigments, etc. provides a texturized protein composition which does not impair the desired color of meat analogs prepared therefrom. Thus, in general, removal of the water-soluble constituents provides fibrous protein compositions having improved orgnaoleptic and textural characteristics.

The extraction rates and water requirements are facilitated by subjecting the hydrated extrudate to intermittent intervals of stress during the solubilization and extraction of water-solubles therefrom. Such intermittent intervals of stress facilitates the removal of the water-solubles by forcing or expelling a concentrated aqueous miscella from the pores and channels of the extrudate into the surrounding external solvent medium. Upon release of stress, the hydrated extrudate reabsorbs solvent from the surrounding extraction medium (e.g., under normal extraction conditions of a substantially reduced solute concentration). This reabsorbed solvent solubilizes and extracts an additional quantity of water-soluble constituents. By freshly replenishing the pores and channels with intermittent expulsion and reabsorption of the extracted medium, the extraction rate of water-solubles from the extrudate is significantly increased. Although not essential, the stress applied to the hydrated extrudates in extracting the water-solubles can be of a sufficient force to rupture the cell walls and separate the fibers. Texturized protein compositions of significantly improved character are achieved when a sufficient amount of water-solubles are extracted from the extrudate so that the resultant product has an enriched protein content of at least 60% of its dry weight. Superior texturized protein compositions are achieved when substantially all of the water-solubles are extracted from the extrudates and the texturized protein composition contains from about 70 to about 85% by weight protein.

In preparing the texturized protein compositions herein, the pH is normally maintained at about 4.0 to about 10. When the process is conducted at a pH below 4.0, the product tends to become tough and bitter. Above a pH of 10, degradation and solubilization of the protein structure normally occurs. Under severe process conditions (e.g., elevated temperatures, a high solvent to solids ratio, excessive contact time, etc.) the pH is advantageouslsy maintained at between 6.0 and 8.5.

Additives to control or alter the textural and/or organoleptic properties of the texturized protein composition can be added to the solvent during the extraction step and/or after removing the water-solubles therefrom. These additives impart similar functional characteristics as they provide in the dry expanded extrudate product. Illustrative additives include buffering agents, salts, protein denaturing agents (e.g., alkali and acids), coloring and flavoring agents, mixtures and thereof and the like.

COLLAPSING THE CELLULAR STRUCTURE

At any time after the dry expanded extrudates are hydrated, the cellular structure of the hydrated extrudate can be collapsed. Collapsing the cellular structure of the hydrated extrudate is accomplished by the application of a sufficient amount of stress (e.g., external force) so that the cellular walls defining the porous interstices of the communicating pores and channels break and/or break apart (e.g., fracturing the cellular walls so that the structure collapses by weakening the cell wall structure sufficiently to collapse the extrudate and/or collapsing by actually severing the cell wall structure). The stress applied to the hydrated extrudate should be of a sufficient magnitude so that the reticulated structure of the hydrated extrudate is ruptured along its longitudinal axis. In comparison to the hydrated extrudate, rupturing of the cellular strucuture results in a product possessing a significantly reduced stength to tensile forces applied laterally to its longitudinal axis (i.e., forces applied normal to the direction of the extrudate extrusion). The stress applied to the hydrated extrudates to collapse their cellular structure may be effectuated by external forces such as tension, compression, shear or any combination thereof. For most meat analog uses, the application of stress which reduces more than a major portion (on a dry weight basis) of the resultant product to a length of about 3 mm. or less should be avoided. Stress which develops strain parallel to the fibers and thereby breaks or separates the fibers are generally suitable. In general, the principle effect of the stress is to collapse the structure of the hydrated extrudate along its longitudinal axis and thereby provides a texturized protein product.

Figure 1:
FIG. 1 is a lateral cross-sectional photomicrograph view (under 75 power magnification) of a dry expanded extrudate which has been hydrated in the presence of a sufficient amount of water to permit the extrudate to absorb 2.5 times its dry weight in water without removing any appreciable amount of the water-soluble constituents therefrom.
Figure 2:
FIG. 2 is a lateral cross-sectional photomicrograph view (under 75 power magnification) of an extrudate wherein substantially all of the water-soluble constituents have been removed therefrom.
Figure 3:
FIG. 3 is a later cross-sectional photomicrograph view under the same magnification as FIG. 2 depicting a texturized protein composition prepared in accordance with the present invention.

The characteristics of the texturized protein composition prepared by subjecting the hydrated extrudates to sufficient force to collapse the cell walls is illustrated by comparing the photomicrographs of FIGS. 1, 2 and 3 in the attached drawings. FIG. 1 is a cross-sectional view lateral to the longitudinal axis of a hydrated extrudate wherein the cell walls have not been collapsed. The product illustrated by FIG. 1 contains a substantial amount of the water-soluble matrix enshrouding the proteinaceous fibers thereof. FIG. 2 is a cross-sectional photomicrograph view of a hydrated extrudate with its cell walls in the intact form (e.g., not ruptured) with substantially all of the water-soluble constituents removed therefrom. FIG. 3 is a cross-section photomicrograph view of a dry texturized protein composition taken in a plane perpendicular to its longitudinal axis and prepared in accordance with the invention with the cell walls thereof being collapsed. The protein content of the products depicted in the photomicrographs of FIGS. 2 and 3 are substantially identical. In FIG. 1, a substantial amount of the water-soluble constituents have not been extracted therefrom as evidenced by the relatively thick cell walls and small interstitial openings (i.e., pores and channels) separating the cell walls. In contrast, FIG. 2 represents an extrudate of an identical composition as that represented in FIG. 1 except that substantially all of the water-soluble constituents (i.e., more than 95% by dry weight) have been removed. It will be noted from FIG. 2 that the cell walls are much thinner due to the extraction of the enshrouding matrix of water-soluble constituents. Likewise, the interstitial space between the cell walls as depicted in FIG. 2 is much greater than that of FIG. 1 due to the absence of the enshrouding water-soluble constituent matrix. It will be observed from FIGS. 1, 2 and 3, that the cell walls form a reticulated structure with the interstitial spaces between the cell walls of FIGS. 1 and 2 being similar to that of the original extrudate from which they were prepared. Thus, the shape and the distribution of the protein portion of the products as well as the location and general shape of pores therein as depicted in FIGS. 1 and 2 is substantially the same as the original hydrated extrudate from which they were prepared.

The texturized protein composition of FIG. 3 has a different structural and textural character than the products depicted in FIGS. 1 and 2. The composition as well as the cell wall thickness of the product depicted in FIG. 3 is comparable to the product of FIG. 2. However, the general configuration and position of the cellular walls in respect to one another of the texturized protein composition in FIG. 3 has been substantially altered by collapsing the cell walls. As may be seen from the cross-sectional lateral view of FIG. 3, collapsing of the cellular structure has occurred in planes normal to the direction the extrudate is formed. The collapsed cellular walls are also evident throughout the entire longitudinal axis of the hydrated extrudate (not shown). In comparison to the product of FIG. 2, collapsing of the cellular structure of the extrudate provides a product having a lesser tensile strength to forces applied normal (i.e., laterally to its longitudinal axis. Accordingly, the product of FIG. 3 is more easily torn apart along its longitudinal axis than either of the products illustrated in FIGS. 1 and 2. When used as a meat analog ingredient, the product of FIG. 3 inherently possesses a more meat-like texture than either products illustrated by FIGS. 1 and 2.

A texturized protein composition having a structural character similar to that of FIG. 3 can be prepared by a variety of means which apply sufficient force to collapse the porous reticulated structure of a hydrated extrudate. Illustrative means for applying a sufficient amount of stress include compacting means such as obtained in centrifuges (e.g., basket, centrifugal screen and disc type centrifuge) and physical compression such as between rollers and the like. Processing under stress conditions which randomly commutate or cut the hydrated extrudate transversely such as conventional meat grinders, milling machines, etc., are not generally suitable.

The collapsing of the cell walls such as illustrated by the texturized protein composition of FIG. 3 is generally characterized as a predominantly rupturing the cell walls by weakening and breaking without effectuating a substantial separation of the ruptured cell walls. Greater utility and functionality of the texturized protein composition as a meat analog ingredient is achieved when the hydrated extrudate is subjected to stress of a suffficient magnitude such that the collapsing effectuates a severing and breaking apart of the hydrated extrudate predominantly along its longitudinal axis (e.g., shredding the extrudate). By employing more severe stress conditions, the hydrated extrudates are thereby shredded into a plurality of discrete fibrous masses (i.e., fibers). Individual fibers prepared by shredding exhibit a high degree of rupturing along the longitudinal axis within the individual fibers per se.

A suitable means for shredding the cellular structure of hydrated extrudates along its longitudinal axis to provide a texturized protein composition of a predetermined length and cross-sectional diameter is accomplished by beating or refining[1] a slurry of water and hydrated extrudate under process conditions as presently employed in preparing stock in the paper industry. Under such bearing conditions, texturized proteinaceous fibers of a desired average length and cross-sectional diameter are obtained. It has been found that the predominate stress obtained by a conventional paper beater or refiner is a shredding action parallel to the length of the extrudate (i.e., along the longitudinal axis) rather than cutting in a plane normal to the extrudate length. The paper beating action shreds the hydrated extrudate into a multiplicity of texturied fibers of a significantly smaller lateral axis size (i.e., cross-sectional diameter). The ability to provide a texturized protein composition having a predetermined length and cross-sectional dimension is a highly desirable factor in simulating the appropriate textural and organoleptic character of a particular meat analog. This is desirable because many of the meat analogs require a particular fibrous character to simulate a particular meat cut. Thus, when it is desired to provide the textural and organoleptic properties of a roast beef, beef steak, relatively coarse texturized protein compositions (e.g., relatively thick and long fibers) are usually employed. For meat analogs simulating ham, fish, shrimp, etc., a relatively fine textural protein composition is employed to impart the appropriate textural and organoleptic character in the meat analog. By subjecting the hydrated extrudates to appropriate beating process conditions, texturized protein compositions which are specifically tailored for a particular meat analog are provided herein.

[1] Beating or refining are fundamentally the same in that both involve mechanical treatment of pulp wherein the pulp fibers are caught between metal bars or between one moving part and another.

Mechanical treatment such as that achieved by a paper beater provides an additional benefit in that it also provides an effective means of extracting the water-solubles therefrom. Because the beating of pulp provides a means of applying intermittent stress to hydrated extrudate (e.g., intermittal stress is applied with each pass of the slurry between the beater rollers and bedplate), the extraction of water-solubles therefrom is inherently facilitated. Thus, as the hydrated extrudate is mechanically caught between metal bars or between one moving part and another, the solvent in the porous interstices is expelled. After passing the zone of mechanical treatment, the slurry solvent is reabsorbed with further solubilization and extraction of the water-solubles. Continuous intermittent expelling and reabsorption of solvent occurs with each mechanical treatment of the hydrated extrudate in a pulp beater and/or refiner. In such a process the water-soluble in the slurry can be partitioned in the concentrated form and separated from the water with the water being recycled into the pulp slurry. Accordingly, the mechanical treatment can be employed as a means of simultaneously conducting the extraction of water-solubles, texturizing of hydrated extrudates and partitioning of the water-solubles from the resultant texturized protein composition. Although it is generally desirable to conduct the extraction of water-solubles and texturization of the extrudate concurrently, hydrated extrudates in which a portion or substantially all of the water-solubles have been extracted therefrom can be texturized via the beating or refining thereof. Similarly, hydrated and texturized protein compositions such as obtained from a multi-stage extraction process may be submitted to the mechanical treatment to provide a texturized protein composition of a predetermined and appropriate size.

In preparing the shredded texturized protein compositions, the predominate mechanical treatment should be of the nature so that longitudinal splitting of the hydrated extrudate results rather than lateral cutting of the fibers into a shorter fiber length. Since the porous interstices of the hydrated extrudate provide a perforated structure, longitudinal splitting and defiberization of the hydrated extrudate pieces occurs predominately between adjacent cell voids or porous interstices. Under such mechanical treatment, fracturing and separation of the reticulated, hydrated protein piece structure predominately along the longitudinal axis of the protein piece occurs (e.g., the fibrous masses of cell walls which laterally bridge the longitudinally oriented masses therein are severed and/or fractured). The resultant fragments exhibit an increased flexibility, and external surface area on a weight basis. The beating also effectuates a plurality of appendages (e.g., fibrallation) in the resultant product. Moreover, the mechanical treatment substantially reduces the internal void space and accordingly, increases the average partial density of the resultant product. Such treatment also increases the surface porosity (e.g., shredding split the extrudate along its porous interstices or void spaces with the split fragments thereof having on its surface the impression of the contoured surface of the initial internal, split void space from which the fragment or fibers are formed). The resultant products also exhibit an increased water-retention character.

The beating and/or refining or the hydrated extrudate to provide texturized protein fibers of a suitable fiber length, fiber width and thickness can be effectuated employing a variety of beaters and/or refiners such as presently used in the paper industry. The beating and/or refining can be conducted under batch or continuous process conditions. Suitable beaters include Hollander beaters and modifications thereof such as continuous beaters, breaker beaters and pulpers which generally increase its efficiency and reduce the time necessary to beat a batch of stock. Because the hydrated extrudates are more easily defiberized than cellulose materials (e.g., wood), the beating conditions employed in preparing the texturized protein fibers herein are generally less severe than those employed in providing paper stock. It is, therefore, advantageous to utilize beater processing conditions which favor a rubbing or bruising action as opposed to a predominately cutting action. Rubbing or bruising mechanical treatment may be achieved by employing process conditions known in the paper industry to favor such treatment. For example, it is advantageous to use beaters which have dull roller bars operated at a relatively low beating-roll pressure. Likewise, slurry temperature and extrudate solids to slurry liquid weight ratios employed should be conductive to rubbing or bruising treatment.

Texturized protein fibers of an appropriate fiber length, width and thickness may also be prepared employing conventional paper refiners such as disc and conical refiners (e.g., jordens and high speed refiners) kollergongs, and the like. Other mechanical treatment means such as high shear pumps, turbulizers, blenders and mixers, high pressure pumps conected in series with baffled pipes, screw conveyors and the like operated under appropriate solids to water ratios and mechanical treatment conditions can also be utilized in preparing the shredded fibers. All such mechanical treatment should be conducted under processing conditions conducive to shredding or splitting of the extrudate in contradistinction to a cutting action.

The texturized protein product prepared by shredding hydrated, cellular structured proteinaceous material is generally characterized as a texturized protein comprising a multiplicity of randomly shaped fibers having as a principle constituent a protein with said fibers being individually characterized as having:

a. an average fiber length substantially greater than its average cross-sectional diameter as measured in a plane normal to the longitudinal axis of the fiber,
b. a reticulated structure of a multiplicity of fibrils with the predominate orientation of the fibrils being parallel to the length of fibers,
c. a substantial proportion of the fibrils lateral to the longitudinal axis of the fiber being ruptured as evidenced by a substantially lesser tensile strength to tensile forces applied normal to the length of the fiber as opposed to tensile forces applied parallel to the fiber length,
d. a non-uniform cross-sectional shape lateral to the longitudinal axis of the fiber,
e. an irregular fiber surface with a plurality of ridges and depressions, and
f. a plurality of appendages branching from the central portion of the fiber.

Comparative to the hydrated extrudate starting material, with or without the solubles extracted therefrom, shredding increases the average particle density of the resultant fibers. The shredding breaks apart the bulky structure of fibrous bundles within the extrudate into a plurality of fibers of a substantial lesser cross-sectional diameter than that of the hydrated extrudate from which the texturized protein fibers are prepared. The shredded fibers appear under a microscope and/or microscopic examination to have a plurality of randomly shaped appendages which are connected and branch outwardly from the fiber mass (e.g., the fibers possess a fibrillated structure).

The water-retention properties of the texturized protein composition and compatability with other meat analog ingredients is significantly increased by the shredding treatment. In general, the texturized protein fibers obtained from the shredding processes are characterized as having a substantially greater fiber length than width and a width substantially greater than depth (e.g., they are relatively flat).

Referring to FIGS. 4 to 12, FIG. 4 represents a photograph of two typical fibers obtained by beating a slurry of hydrated extrudate containing 300 gms of solids and 10 l. of water in a conventional paper beater for one minute. The hydrated extrudates prior to shredding with the paper beater were about 25± 3 mm long and had an average cross-sectional diameter of about 15± 3 mm. As illustrated by the background grid ruled in one millimeter units of FIG. 4, the fiber length, after one minute of beating is about the same as the starting extrudate (i.e., about 23–25 millimeters). The beating action, however, has substantially shredded the extrudate into a plurality of fibers which have a substantially smaller cross-sectional diameter than the extrudates from which they were prepared. (15± 3 mm of the extrudate as opposed to the fiber width ranging from about 2 mm to about 5 mm.)

Figure 4:
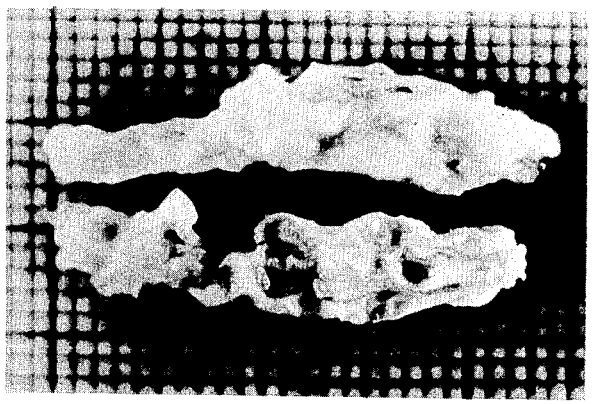
Figure 5:
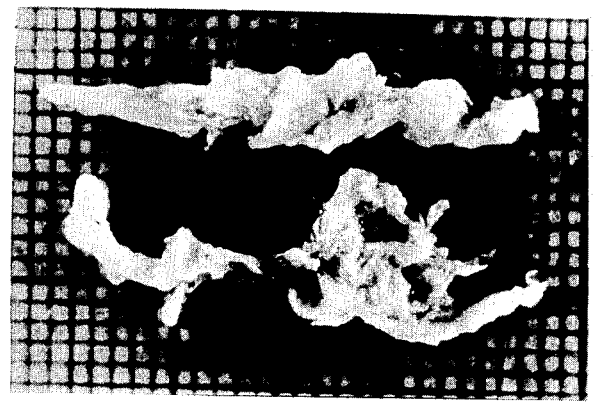
Figure 6:
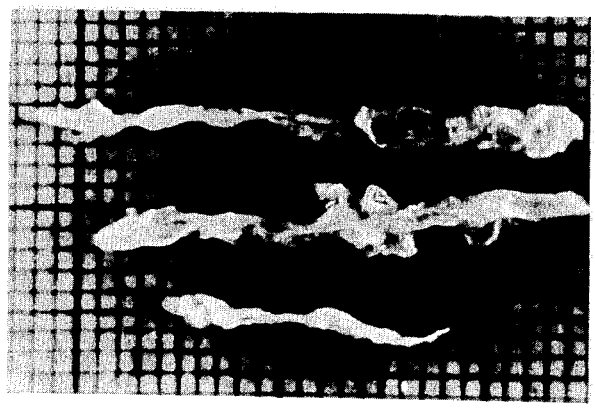

As illustrated in FIG. 4, the fibers obtained by beating a hydrated slurry of extrudate have a substantially greater fiber length (i.e., longitudinal length) than the cross-sectional width as measured along the lateral axis of the fiber length (e.g., the fiber length ranges from about 23 to 25 millimeters and the width ranges from about 2 to 5 millimeters). The fibers of FIG. 4 are random in shape and have an irregular fiber surface containing a plurality of ridges and depressions. As previously mentioned, the porous interstices of the hydrated extrudate provides a perforated structure which facilitates the shredding thereof. The split fragments or fibers of FIG. 4 illustrate teh cavitated surface resulting from longitudinally splitting of the hydrated extrudate throught the internal porous interstices of the extrudate from which they were formed. The lateral width of the fibers depicted in FIG. 4 is substantially non-uniform along its entire fiber length varying from a minimum width of about 2 millimeters up to about 5 millimeters.

Figure 7:
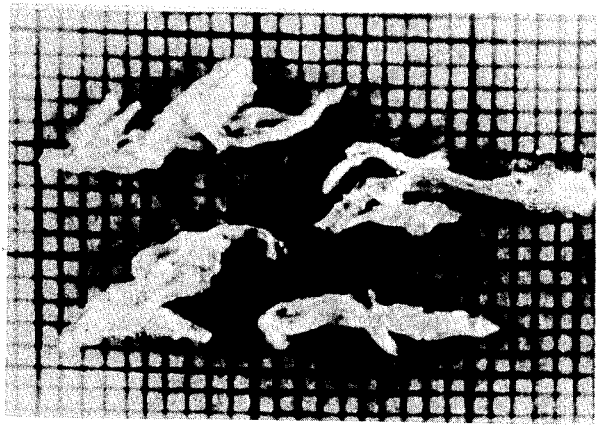
Figure 8:
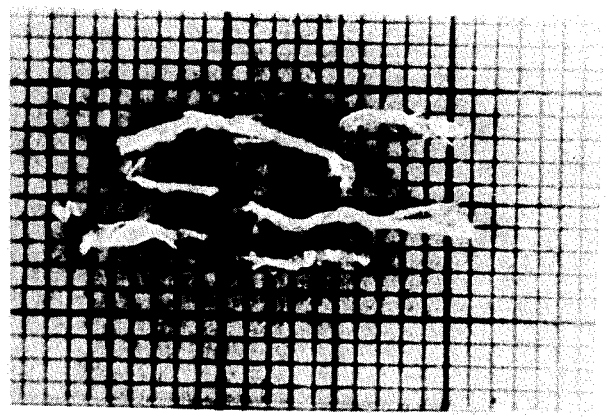
Figure 9:
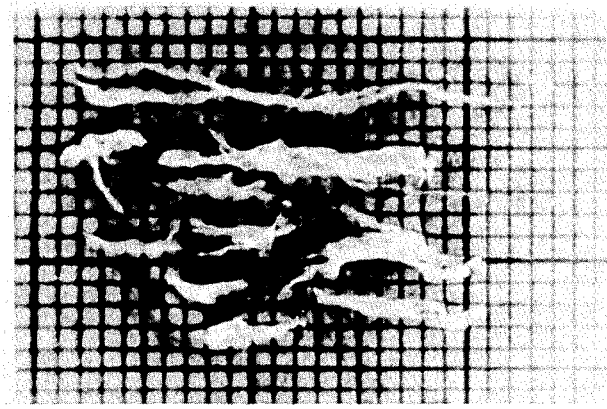
Figure 10:
Figure 11:
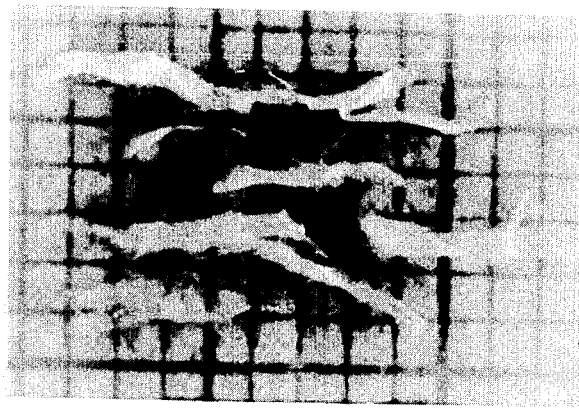
Figure 12:
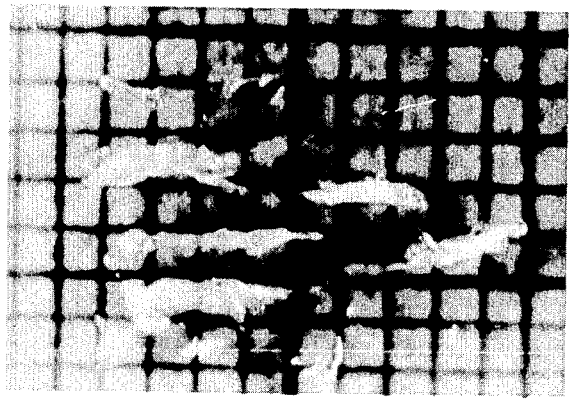

FIGS. 5, 6, 7, 8, 9, 10, 11 and 12 are photographs of texturized protein fibers obtained by beating the slurry respectively for 2, 3, 4, 5, 6 7, 8 and 10 minutes. The background grid for each of these photographs is also ruled in one millimeter units. The length of the fibers illustrated by FIGS. 5 and 6, in general, closely approximates the fiber length of FIG. 4 as well as the original hydrated extrudate pieces. However, the additional beating has effectuated a substantial reduction in fiber mass (e.g., the cross-sectional size of the fiber along its lateral axis is substantially reduced). The fibers depicted in FIGS. 5 and 6 have a greater number of branched appendages than the fibers of FIG. 4. This more pronounced branching is primarily due to a greater degree of rupturing fibrils positioned primarily along the longitudinal axis. As illustrated by the fibers of FIG. 4, the fibers exhibit a much lesser degree of rupturing in a lateral direction to the fiber's longitudinal axis. FIG. 7 represents a photograph of typical texturized fibers obtained by beating the hydrated extrudate pieces in a conventional paper beater for 4 minutes. Separation and rupturing of the fibrils along the longitudinal axis of the fibers is substantially more pronounced in FIG. 7 than in the fibers of FIGS. 4, 5 and 6. As a result, the texturized protein fibers of FIG. 7 have a more highly branched structure and a greater surface to weight ratio than the texturized fibers of FIGS. 4, 5 and 6. The effects of progressively greater degrees of defiberization of hydrated protein pieces into smaller texturized protein fibers is further illustrated by FIGS. 8, 9, 10, 11 and 12.

As shown in FIGS. 4 to 12, the cross-sectional diameter of the fibers in a plane perpendicular to its longitudinal axis (i.e., lateral to the fibers longitudinal axis) is generally substantially less than the fiber length (e.g., compare the lateral width of the fibers to its length). Continued mechanical treatment or defiberization of the hydrated protein pieces will progressively reduce the cross-sectional diameter of the fibers as depicted by a sequential comparison of FIGS. 4 to 12. It will also be observed from FIGS. 4 to 12 that along the longitudinal axis of each fiber the cross-sectional dimeter of the fiber in a plane perpendicular to its longitudinal axis (i.e., along its lateral axis) is non-uniform, changing considerably throughout its entire length (e.g., compare the varying width along the entire length of the fiber). The resultant fibers preceding in sequential order from FIG. 4 through FIG. 12 also have progressively lesser depth. The depth of the fibers generally is substantially less than its width. Like the fiber width shown in FIGS. 4 to 12, the thickness or depth of a particular fiber is also non-uniform. Like the fiber width shown in the photographs, the fiber depth will vary significantly along both the longitudinal axis and lateral axis of the fibers (as illustrated by the varying shades of darkness throughout the fibrous mass of the photographs).

The fibers obtained by the defiberization of hydrated extrudates are also characterized as possessing a plurality of appendages which branch outwardly from the central portion of the fiber. These appendages are primarily in the form of relatively thin flaps or unraveled membrane-like masses. These appendages are contiguously attached to the main fiber mass. In general, the appendages have a thickness substantially less than the main body of the fiber. The tensile strength of the appendages (e.g., resistance to tearing) is normally substantially less than the main body of the fiber to which they are attached.

Due to mechanical forces applied to the fibers during the shredding of the extrudate into progressively smaller fragments, the fibers possess less tensile strength to forces which are applied normal to the longitudinal axis of the fiber as compared to tensile forces which are applied parallel thereto. Rupturing of the fiber structure throughout its longitudinal axis during the shredding thereof is a major factor contributing to this lose in tensile strength. The predominate rupturing of the fiber along its longitudinal axis in combination with a predominate longitudinal fibril orientation provides a texturized fiber having greater tensile strength to forces applied in the direction of its longitudinal axis than forces normal thereto. Since it is necessary to severe a greater fibrous mass by tensile forces parallel to its length in contradistinction to tensile forces traverse thereto, the actual difference in a tensile strength on a given fiberous mass basis is substantial. The considerable degree of rupturing and actual fibril separation within the resultant fibers is further illustrated by the photomicrographs of FIGS. 13, 14 and 15. The respective fibers under the 50 power magnification thereof exhibit a plurality of microscopic, branched appendages which were not visable macroscopically. Fibril separation within the main body of the fibers is also evident by the photomicrographs of FIGS. 13, 14 and 15. Also evident in FIGS. 13, 14 and 15 is the predominate fibril orientation along the longitudinal axis of the fiber.

In comparison to hydrated extrudates and spun filament type products, the increased fiber surface area significantly enhances the compatibility and functionality of the texturized protein fibers as a meat analog component. Since the defiberization processing thereof ruptures the fibrils within the fibers, the resultant texturized protein fibers also possess improved textural properties over hydrated extrudate pieces as well as the spun protein filaments. By controlling the degree of beating, texturized protein fibers of a predetermined fiber size and textural character can be tailor made for adaptation in providing meat analogs of any desired textural and organoleptic character.

The resultant texturized protein composition prepared herein may be directly utilized in the hydrated form or dried. Since the texturized protein compositions are not stable against microbial and enzymatic degradation in the hydrated form, it is usually necessary to stabilize the texturized compositions against microbial and enzymatic degradation. Sanitary conditions in preparing the texturized protein compositions should also be employed. Suitable means for inhibiting or eliminating such a degradation include the addition of bacteriacides, pasturization, freezing and refrigerating, drying the product (e.g., to a moisture level of less than 6%) and other conventional means of stabilizing products against such degradation. If the texturized protein composition is dried, the resultant dried product appears to be more compact than the hydrated texturized protein composition. The drying, however, merely removes the water without changing the hydration characteristics and structure of the product.

The texturized protein compositions of the present invention are particularly suitable in providing full meat analogs simulating natural meat cuts such as roast beef, ham, beef steak, seafoods, poultry, roast pork, and the like. Texturized protein compositions of a predetermined and appropriate size are selectively employed depending upon the particular meat cut to be simulated. Because the process provides a means of eliminating the adverse flavor components thereof, the bland tasting texturized protein compositions are fully comparable and receptive to a wide variety of meat flavoring agents. Since the texturized protein compositions have a bland color, they can be conveniently dyed to fit the needs of the desired meat analog. Likewise, other conventional meat analog additives such as sugar, fats, and binders (e.g., egg albumin and wheat gluten) and the like are easily combined with the texturized protein composition to provide superior meat analog products.

The length and cross-sectional diameter of the shredded fibers necessary to provide a satisfactory meat analog will depend upon the particular textural and organoleptic properties desired in the final meat analog. Thus, depending upon the desired simulated meat product, the desired fiber length can vary considerably (e.g., about 0.5 up to 300 millimeters or more). The processing conditions herein, however, permit the production and recovery of fibers wherein the average particle length and cross-sectional diameter is substantially uniform. For most meat analogs, it is advantageous to recover and provide fibers wherein the majority of the fibers (weight basis) have a length ranging from about 1 mm. to about 100 mm. and a cross-sectional diameter of about 0.1 to about 10 mm. Meat analogs of an improved textural and organoleptic characteristics are generally achieved by employing as a meat analog ingredient a majority of fibers (on a weight basis) which have a length ranging from about 3 mm. to about 25 and a lateral cross-sectional diameter ranging from about 0.5 to about 5 mm.

Another suitable method for preparing texturized protein compositions of the type illustrated by FIG. 3 is to employ a dry expanded extrudate characterized as comprising a plurality of distinct helicoid laminates separated by a plurality of reticulated pores and channels juxtaposed and oriented predominantly parallel to the planar surface of the helicoid laminates therein (i.e., the helicoid laminates are oriented along its longitudinal axis). Such a helicoid laminar extrudate consists essentially of fibers of denatured protein enshrouded by a matrix of water soluble constituents separated by the reticulated pores and channels (i.e., open cells). In the hydrated form the extrudate is a pliable and resilient mass. The plurality of reticulated pores and channels juxtaposed and oriented predominantly parallel to the planar laminate surface significantly facilitate the rate at which the extrudate is hydrated. The water absorption and retention characteristics are greater than conventional extrudates. In addition to having a relativelly fast hydration rate and water absorption capacity, the helicoid extrudates exhibit a uniform hydrated texture. In the hydrated form, the helicoid laminates of the hydrated extrudate can be readily separated (e.g., by peeling or unrolling) into distinct laminates. The helicoid extrudates are particularly useful in preparing the texturized protein composition herein because the unique structure thereof greatly facilitates the extraction of water-soluble constituents from the enshrouding matrix and its texturization by mechanical treatment.

Dry, expanded, helicoid extrudates having the aforementioned characteristics are generally prepared by a method comprising the steps of:

a. providing a proteinaceous material containing a protein solids content of at least 35% by weight of a heat denaturable protein and a water to solids ratio ranging from about 1:9 to about 3:2;

b. working the proteinaceous material in a first confining zone at a temperature of about 200°F. to about 400°F. under pressure and for a period of time sufficient to form a hot fluid homogeneous mass of said proteinaceous material;

c. forcing the hot fluid homogeneous mass through a first die orifice into a second confining zone which is maintained at pressure ranging from no more than 20% to about 90% of that provided in the first confining zone;

d. simultaneously cooling and expanding the hot fluid homogeneous mass for a period of time sufficient to provide a semi-solid proteinaceous mass exhibiting a substantially lower degree of fluidity than the hot fluid homogeneous mass in the first confining zone; and e. extruding the semi-solid mass through a second die orifice into a drying zone maintained at a substantially lower pressure comparative to the second confining zone, and thus providing a dry, expanded helicoid proteinaceous material.

Suitable proteinaceous material in preparing the helicoid extrudates may be any proteinaceous material which contains at least 35% on a dry weight basis of a heat denaturable protein.

The first step in preparing the dry expanded extrudate possessing the helicoid structure is to provide an aqueous mixture containing the proteinaceous material. The amount of water in the mixture broadly ranges from about 15% to about 60% by weight of the total mixture. For optimum results, the moisture content of the mixture should be within the range of 18% to 40%. The proteinaceous material should contain a substantial amount of protein, so that at least 35% by weight of the mixture (dry basis) is protein. Greater amounts of non-protein material will inhibit, and even prevent, the formation of the desired texture and structure of the extruded product. Low concentration of protein also reduce the nutritional value of the extruded products.

Other additives conventionally employed to alter the textural and organoleptic character of an extrudate such as those disclosed in U.S. Pat. No. 3,488,770 can also be added to the mixture. The amount of these additives depends on the type of meat being simulated. For a soft or tender meat simulation, little or no additives are used. If a tougher texture is desired, additives such as sodium chloride and calcium chloride may be used in the proteinaceous material-water mixture to vary the textural character of the extruded product. However, because the improved extrusion process of the present invention yields a product that is more highly textured, the salt requirements in the proteinaceous material-water mixture is significantly less relative to prior art processes (e.g., seldom more than 1.5% by weight of the mixture). For most dry expanded extrudates possessing the helicoid structure it is desirable to completely eliminate these salts from the proteinaceous material-water mixture. Various flavors and coloring additives can be combined with the mixture prior to extrusion. However, if water-solubles are to be extracted from the hydrated extrudate as mentioned above, meat-like flavors and colors are added after the extraction processing. The mixture, once formed and blended, is fed to the extruder.

A suitable extruder for preparing the helicoid extrudates is illustrated by FIG. 16 which represents a longitudinal cross-sectional view of an extruder. The extruder barrel (shown generally at 10) houses a first confining zone 11 which is equipped with a screw conveyor 12 which forces the proteinaceous material-water mixture along the direction of extrusion through the barrel 10. The mixture is usually fed by gravity via feeding means 13 to the extruder barrel 10. The barrel 10 also includes jacket sections 14, 16, 18 and 20 and 21 (and possibly other sections not shown) which can be independently supplied with coolant or heating medium to control the temperature along barrel 10. The first die, 22 has a series of orifices, 24. The second die 26 also has a series of orifices 28. Die 22 is separated from die 26 by a spacer section 32 which forms the second confining zone 30.

The action of the screw conveyor 12 provides agitation and working of the mixture in the first confining zone 11 (e.g., working chamber), heat to the mxture (by friction), and also, depending on the compression ratio of the screw 12, develops the desired pressure in the first confining zone 11. The temperature of the product in the extruder can be effectively controlled by a coolant or heating medium in jacket sections 14, 16, 18, 20 and 21. As the mixture moves in the direction of extrusion through the first confining zone 11, toward the first die 22, it is in the fluid rather than the solid state and, therefore, susceptible to structural change.

To fluidize the mixture within first confining zone 11, the mixture is maintained at a temperature within the range of 200°F. to 400°F. while it is continuously agitated or worked. The pressure from the first die 22 being maintained within the range of about 100 psi to 500 psi. During fluidization of the mixture in the first confining zone 11, the protein portion of the mixture is "cooked" or "denatured." Working of the mixture and fluidizing in the first confining zone 11 cleaves the associative bonds between the protein molecules and provides a hot fluid homogeneous mass of protein molecules enshrouded by soluble constituents and water. In general, the time required for the mixture to be transformed into a fluid denaturated mass normally decreases as the temperature and pressure increases. When protein derived from soybeans is used in the mixture, fluidization and denaturization of the protein usually ranges from about one to about 10 seconds. Although the denatured protein within first confining zone 11 is fibrous, the protein fibers are not sufficiently bonded together or set to provide the appropriate helicoid orientation of the dry expanded extrudate.

The hot fluid mass of proteinaceous material is then forced from the first confining zone 11 through a first die 24 into a second confining zone 30 which is maintained at a pressure no more than about 20% to about 90% that of the first confining zone 11. In the second confining zone 30, the hot fluid homogeneous mass is simultaneously cooled and expanded. The hot fluid mass upon cooling and expanding becomes less fluid due to the orientation and crosslinkage of the protein molecules in the form of helicoid fibrous matter which is enshrouded by soluble constituents and water. After the hot fluid mass has been adequately cooled and expanded in the second confining zone 30, it becomes a semi-solid mass. The resultant semi-solid mass is then extruded through a second die 26 into a drying zone maintained at a substantially lower pressure (normally into a zone at ambient conditions) comparative to the second confining zone 30 whereupon the extruded product dries and expands.

The head assembly of the extruder in FIG. 16 is shown in greater detail by the exploded side elevational view of FIG. 17. In FIG. 17, the first die 22 is provided with mounting means 23 to secure the first die 22, spacer section 32 and second die 26 to the first confining zone 11. A hollow spacer 32 adapted to be secured in juxtaposition to the first die 22 and second die 26 forms the second confining zone 30. In general the orifices 24 have a total orifice area of 20% to about 70% that of the orifices 28 in the second die 26. The net effect of a greater orifice area of die 26 relative to the orifice area of die 22 is to provide a significant pressure drop in the second confining zone 30. This pressure drop simultaneously cools and expands the hot homogeneous mass and creates a helicoid laminar flow of product through the second confining zone 30. The die orifices 24 and 28 may be of any size or shape. To effectively prepare the helicoid extrudate laminates the orifices of the adjacent dies should be located alternately at the central part of one die and at the periphery of the immediately preceding and/or succeeding die. In the two die system of FIG. 17, the orifices 24 are located in the central part for first die 22 while the orifices 28 are located at the periphery of second die 26. This arrangement can be reversed (i.e., the first die having peripheral orifices and the second die with centrally located orifices) with no adverse effect. The advantage of having alternate peripheral and centrally located orifices is that this configuration maximizes the holding time of the mixture in the second confining zone 30 between adjacent dies and thus maximizes the amount of conditioning that takes place in the first and second confining zones.

After the fluidized mixture is forced through the first die 22, into the second confining zone 30, the proteinaceous material-water mixture is still fluid and susceptible to structural change. In the second confining zone 30, the fluidized mixture tends to set or harden. If the residence time in the second confining zone 30 is excessive, the product will not adequately expand when extruded to the atmosphere. Thus, the size and length of the second confining zone 30 (as well as the temperature and pressure maintained there) has an effect on the degree of expansion occurring when the semi-solid mass is forced through orifices 28 of die 26 into the drying zone. It has been found that acceptable helicoid extrudates are formed if the residence time of the product in the second confining zone 30 is between about 0.5 and about 3 seconds.

As mentioned above, the pressure of second confining zone 30 is maintained at a pressure intermediate to the pressure upstream of the first die 22 and downstream of the second die 26. Improved helicoid extrudates are achieved when the pressure within the second confining zone 30 is maintained within the range from about 50 psi to about 90 psi. The temperature and pressure in the second confining zone 30 is most effectively controlled by varying the number and/or size of the die orifices of dies 22 and 26. As the temperature and pressure within the second confining zone 30 decreases, the amount of expansion that results from extrusion through the second die 26 also decreases. The temperature within the second confining zone 30 is usually maintained at about 200°F. to 250°F.

In preparing the helical extrudates, the temperature and pressure just upstream of the first die 22 are in excess of about 250°F. and about 250 psi, respectively. As the mixture moves through the first die 22 and into the second confining zone 30, it enters an environment having a lower temperature and pressure. The extrusion through the first die 22 causes additional working and stretching of the protein fibers present in the mixture, thus increasing the texturization of the mixture. However, contrary to prior processes, the environment immediately down stream of the initial die does not permit rapid expansion of the once-extruded mixture. This expansion occurs in prior art processes because of escape of steam. In the two-die system, the temperature and pressure conditions in the second confining zone 30 actually minimizes the loss of water. As a result, the mixture extruded through orifices 24 into the second confining zone 30 remains fluid and the protein fibers are further worked and stretched. Additional cooking (denaturing) of the protein fiber strength occurs in the second confining zone 30. If the residence time within the second containing zone 30 is excessively long, the protein fibers will form a rigid network which will resist expansion upon final extrusion. The residence time of the mixture in the second confining zone 30 should not be too long since it will become difficult and even impossible to further extrude. Additional work, stretching and orientation of the protein fibers results from forcing the semi-solid mass through the second die orifices 28 into the atmosphere. Upon issuance into the atmosphere the excess moisture evaporates to provide a dry expanded extrudate of a helicoid laminar structure. In general, the helicoid extrudates are less expanded than products from prior art processes. The temperature and pressure in the second confining zone 30 can be varied to control the degree of expansion. An overly expanded product has a "spongy" or very porous structure while the product that has not expanded sufficiently is hard and very dense. Neither of the products at these two extremes of expansion is satisfactory. By controlling the extent of expansion between these two extremes, it is possible to simulate a full range of meat-like textures — from very tender to very chewy. Under proper processing conditions, the cross-sectional dimension of the helicoid extrudate can be controlled by the size and shape in the final die orifices 28.

After the excess moisture evaporates off (e.g., oven drying 5 minutes or more), the extruded product will contain between about 5% to about 8% by weight of water and has a porous structure. The protein fibers of the helicoid extrudates produced by the present invention are more highly structured and stretched than the fibers of prior art products because of processing conditions. Because of the improved textural character, the helicoid extrudates inherently possess a more meat-like character, especially when processed under conditions to provide the texturized protein composition above. The extrudates more rapidly accept water, on hydration, than do the prior products. An increased rate of hydration is a valuable property since it simplifies further processing of the product. The helicoid extrudates herein will absorb between about 2.5 and 5 times its weight in water. From a structural stability viewpoint, the helicoid extrudates are able to withstand cooking in water at elevated temperatures without disintegrating for substantial long periods of time.

The following examples serve to further illustrate the present invention.

EXAMPLE 1

This example illustrates the use of a two-die system to prepare a dry, expanded, helicoid extrudate.

200 pounds of a defatted soybean flour meal of protein concentration of about 50 percent and 60 pounds of water were added to a blender. 290 grams of sodium hydroxide, 830 grams of sodium chloride and 830 grams of calcium chloride were dissolved in one gallon of water and added to the blender. The material was heated to 120°F. and blended for 20 minutes. The resultant blended material was then introduced to a barrel-type extruder (a "Wenger X-25 model"). The heat assembly section of the extruder was modified as follows. Two dies were used with a 1½ spacer chamber between them. The first (upstream) die had eight 3/16 inch circular holes located in a cluster in the central part of the die. The second (downstream) die had six 7/16 inch circular holes located around the periphery of the die and one ⅝ × 1 inch slot located in the central part of the die.

Mixed material was fed to the extruder at a rate of about 350 pounds per hour. Additional water at the rate of about 60 to 70 pounds per hour was added to the mixed material in the extruder barrel. The retention time in the barrel of the extruder was about 10 seconds. The screw conveyor located inside the extruder barrel was operated at about 350 rpm. The temperature and pressure recorded just ahead of the first die was 275°F. and 130 psi, respectively. The temperature and pressure recorded just upstream of the second die was about 215°F. and 80 psi, respectively. After passing through the second die the mixture was discharged to the atmosphere.

The excess moisture was allowed to flash from the product after extrusion causing the product to expand. This resultant helicoid extrudate, which contained about 5% by weight of residual moisture, was hydrated with 3 parts of water per part of product by immersing the product in water at 180°F. for 20 minutes. The hydrated product had a tough, dense texture similar to white chicken meat, cooked clam meat, shrimp meat and the like. This texture was retained even after the product was subjected to retorting at 240°F. for 30 minutes.

EXAMPLE 2

This example illustrates the use of the helicoid extrudates as starting materials for full meat analogs.

The helicoid extrudate was made according to the procedure illustrated in Example 1 except that no sodium chloride or calcium chloride was added. 300 grams of this extruded product (25 mm long and 18 mm diameter) was slurried in 10 liters of water. The slurry was maintained at 180°F. for 5 minutes. The slurry was then placed in a centrifuge operated at 2,000 Gs to remove excess water and collapse the structure of the hydrated helicoid extrudate. The centrifuged product was again slurried with water, as before, and centrifuged. The resulting texturized protein composition having a collapsed cellular structure and a bland flavor, was dried using warm air. The protein concentration was 75 percent by weight (dry substance basis). The texturized protein composition was incorporated into a simulated chicken loaf as follows.

Two blends of the following ingredients were made (the amounts are those necessary to make an eight ounce chicken loaf).

|  | Blend A |  | Blend B |  |
|---|---|---|---|---|
| Texturized Protein Composition | 45 grams | Chicken flavor | 12 | grams |
| Water | 180 grams | Chicken aroma | 0.2 | grams |
|  |  | Dextrose | 7 | grams |
|  |  | Egg albumin | 18 | grams |
|  |  | Fat | 20 | grams |

Blends A and B were mixed together and the temperature of this mix was maintained above the melting point of the fat. The mix was then packed in a lined metal can with the pieces of texturized protein being placed length-wise in the can. The can was sealed and placed in water at 200°F. for 30 minutes to allow the mix to heat set. The simulated chicken loaf that resulted had satisfactory odor, flavor, and texture. The resultant meat analogs possessed "superior" mouth-feel when compared to meat analogs prepared from spun protein filaments.

EXAMPLE 3

This example illustrates the use of a textured protein product produced using a single die extrusion.

A crude extruded product was prepared according to the procedure outlined in Example 1 except that only one die (the final die in Example 1) was used for extrusion. The resulting extruded product was washed and texturized as illustrated in Example 2. The lateral cross-sectional photomicrograph of this product is illustrated in FIG. 3. The texturized protein composition was incorporated into a simulated chicken loaf following the procedure of Example 2. The resultant meat analog was of a superior quality from a textural and organoleptic standpoint when compared to meat analogs produced using spun protein filaments. The texture was more tender than that of the meat analogs of Example 1.

EXAMPLES 4 and 5

The following examples illustrate the importance of employing texturized protein compositions in meat analogs.

An extruded product was prepared using the one-die extrusion method described in Example 3. One portion of this product, without being subjected to either washing or texturizing, was incorporated into a chicken loaf following the procedure given in Example 2. The hydrated extrudate containing substantially all of the water-soluble constituents therein is illustrated in FIG. 1. The resulting meat analog was unsatisfactory for the following reasons:

1. The product had a beany and scorched flour character.
2. The texture or structure of the analog was such that individual pieces were discernable and these individual chucks tended to be pulled from the mass during slicing.
3. The apperance was not that of the product simulated.

Another portion of the extrudate was washed in water following the procedure of Example 2, but was air dried and not collapsed or compacted. This hydrated extrudate is represented by the lateral cross-sectional photomicrograph of FIG. 2. The washed product was then incorporated into a chicken loaf by the procedure of Example 2. Again the resulting meat analog was unsatisfactory for the following reasons:

1. The texture was such that individual chucks were discernable. These chunks tended to remain intact and caused poor slicing characteristics, i.e., crumbling.
2. The meat-type structure of the meat analog produced in Example 2 was not obtained.

These last two meat analogs when compared to the analog prepared in Example 3 clearly show the beneficial effect of compacting the extruded product prior to incorporation into full meat analogs.

EXAMPLE 6

Texturized protein compositions of a predetermined length fiber and cross-sectional diameter were prepared from dry expanded extrudates of Example 3. In this example dry expanded extrudates were cut in a manner such that the hydrated extrudates therefrom were about 25 mm ± 3 mm long and had a lateral cross-sectional diameter of about 13 mm ± 3 mm. The extrudates were then hydrated and a substantial portion of the water-solubles removed by slurrying one part by weight extrudate in 5 parts by weight water at 160°F. After 20 minutes of slurrying excess water was drained from the extrudate pieces and a sufficient amount of compression (without collapsing the extrudate structure) was applied to the extrudate to expell a major portion of the free water from the porous interstices of the extrudate. Substantially all of the water-soluble constituents were extracted from the extrudates by consecutively repeating the above slurrying and expelling steps twice. Due to the extraction of water-solubles from the extrudates, the extrudates solid content was reduced by about 25% by weight.

After extraction, excess water was drained from the hydrated extrudates with each batch being submitted to a conventional paper beating process to provide a texturized protein composition of a predetermined average fiber length and cross-sectional diameter. The paper beater employed was a one-half pound "Niagara Beater" manufactured and distributed by Valley Iron Works Company of Appleton, Wisconsin. Clearance between the beater roll and bedknife was maintained by employing no weight on the bedplate. Into the beater tub there was placed 900 grams of the hydrated extrudate pieces substantially free from non-proteinaceous and carbohydrate water-solubles (i.e., 300 grams of extrudate solids) and 10 liters of water at 25°C.

The paper beater motor was then engaged whereupon the extrudate and slurry began to continuously circulate around the beater tub and between the beater roll and bedknife. Upon each pass of the extrudates between the rolls and knifebed, the hydrated pieces were predominantly shredded into smaller pieces of a lesser cross-sectional dimensions without substantial reduction in the length. Samples of texturized protein fibers prepared thereby were removed from the beater tub at beating time intervals of 1, 2, 3, 4, 5, 6, 7, 8 and 10 minutes by means of wire mesh screen inserted into the stock slurry. Photographs ranging from no magnification to about 2 power magnification on a background ruled in 1 mm units were taken of the recovered samples. The photographs of typical fibers after the beating thereof for 1, 2, 3, 4, 5, 6, 7, 8 and 10 minutes are respectively illustrated in FIGS. 4, 5, 6, 7, 8, 9, 10, 11 and 12. It is evident from the Figures that the continuous beating of the pieces will effectuate certain degree of reduction in the fiber length but the predominate mode of rupturing thereof is along the longitudinal axis of the fiber. To illustrate the ruptured character of the individual fibers photomicrographs of fibers under 50 power magnification were taken of extrudate pieces which had been beaten for 6, 8 and 10 minutes. Photomicrographs of typical fibers obtained after 6, 8 and 10 minutes are respectively illustrated by FIGS. 13, 14 and 15.

Various meat analogs can be prepared employing the fibers of this Example. The textural and organoleptic characteristics of the meat analog can be modified significantly by substituting the fibers of varying size such as obtained at various time intervals of beating. The desired meat analog character for a wide spectrum of meat products ranging from seafoods, chicken, beef and pork etc. are readily obtainable by selecting the appropriate fibers necessary to achieve the desired meat analog product. Meat analogs simulating a specific meat character are obtainable with a high degree of reproducibility by selecting a specific type of fiber (e.g., through the proper shredding treatment) in combination with the necessary meat analog ingredients to simulate the desired meat. Water-retention and compatibility with the other meat analog ingredients is superior to either conventional spun protein filaments or hydrated extrudates. Superior ground meat type products can also be prepared employing the shredded fibers. The fibers are compatible with flavoring and coloring agents without impairing their intended or desired functionality. In conjunction with other meat analog ingredients, the fibers are adapted to provide an integrated meat-like structure with a superior meat-like appearance and texture. Due to the unique character of the fibers, the shredded fibers are not detectable as discrete fibrous masses but rather have a character of being an integral part of the meat analog. Upon mastication of the meat analog, the fibers are adapted to remain as an integral part of the meat analog without separation into a detectable non-integral fiber unit.

Since many embodiments of this invention may be made and since many changes may be made in the embodiments described, the foregoing is interpreted as illustrative and the invention is defined by the claims appended hereafter.

What is claimed is:

1. A method of preparing shredded protein products possessing an improved meat-like texture from hydrated protein extrudates, said method comprising the steps of:
    a. providing a plurality of hydrated extrudate pieces, characterized as containing on a solid weight basis a minor amount of water-soluble carbohydrates and protein as a principal constituent, said extrudates being further characterized as individually comprising a cellular, reticulated structure of a multiplicity of fibers bonded to one another, said fibers being enshrouded by a matrix of water soluble constituents with a plurality of pores and channels communicating within said matrix, the pores and channels being oriented predominantly in juxtaposition to the fibers and separated from one another by cellular walls comprised of said fibers and said matrix of water-soluble constituents, and
    b. subjecting the hydrated extrudate pieces to a shredding force sufficient to rupture and split the hydrated extrudate pieces predominantly along the longitudinal axis of said hydrated extrudate pieces and thereby provide a plurality of fragments of a substantially lesser cross-sectional diameter than the hydrated extrudate pieces.

2. The method according to claim 1 wherein the shredded protein product is substantially free from water-soluble constituents.

3. The method according to claim 1 wherein a sufficient amount of water-soluble constituents from the enshrouding matrix have been extracted to provide a shredded protein product having a protein content on a solids weight basis of at least 70% and the extraction of water-solubles is effectuated by the utilization of at least two extraction mediums with at least one subsequent extraction medium containing a lesser amount of water-solubles than a prior extraction medium.

4. The method according to claim 3 wherein the extrudates are prepared from defatted soybean flours.

5. The method according to claim 1 wherein a sufficient amount of water-soluble constituents have been extracted to provide a shredded protein product having at least 70% by weight protein solids and the extraction of water-solubles is facilitated by the application of intermittent stress of sufficient force to expel solubilized water-solubles from the porous interstices of the hydrated extrudate pieces.

6. The method according to claim 5 wherein the extrudates are prepared from defatted soybean flours.

7. The method according to claim 1 wherein a sufficient amount of water-soluble constituents have been extracted to provide a shredded protein product having from about 70% to about 85% protein on a solids weight basis and the extraction of water-solubles is accomplished by multistage extraction steps employing solvent mediums in subsequent stages which progressively contain a lesser amount of water-solubles.

8. The method according to claim 7 wherein after each extraction stage the solids obtained therefrom are subjected to intermittent stress of sufficient force to facilitate the expelling of substantially all of the solubilized water-solubles from the porous interstices of the solids and the hydrated extrudate pieces have a solids composition consisting essentially of a heat-denatured soybean flour.

9. The method according to claim 7 wherein the extrudates are prepared from defatted soybean flours.

10. The method according to claim 1 wherein the shredding force is conducted under conditions whereby on a solids weight basis substantially all of the resultant fragments are longitudinally split into fragments having a longitudinal length substantially greater than their cross-sectional diameter and the hydrated pieces have a solids composition consisting essentially of heat-denatured vegetable seed flour having a residual lipid content of about 0.5 to about 5% by weight.

11. The method according to claim 1 wherein the shredding thereof is sufficient to provide a mulitplicity of discrete randomly shaped fibers individually characterized as having:
  a. an average fiber length substantially greater than its average cross-sectional diameter as measured in a plane normal to the longitudinal axis of the fiber,
  b. a reticulated structure of a multiplicity of fibrils with the predominate orientation of the fibrils being parallel to the length of fibers,
  c. a substantial proportion of the fibrils lateral to the longitudinal axis of the fiber being ruptured as evidenced by a substantially lesser tensile strength to tensile forces applied normal to the length of the fiber as opposed to tensile forces applied parallel to the fiber length,
  d. a non-uniform, cross-sectional shape lateral to the longitudinal axis of the fiber,
  e. an irregular fiber surface with a plurality of ridges and depressions, and
  f. a plurality of appendages branching from the central portion of the fiber.

12. The method according to claim 11 wherein the extrudates are prepared from vegetable seed flour obtained by the solvent extraction of oils from vegetable seeds.

13. The process according to claim 12 wherein on a solids basis the hydrated pieces are prepared from extrudates containing from about 40 to about 65% protein and from about 5% to about 20% water-soluble constituents.

14. The method according to claim 13 wherein the extrudates are prepared from defatted soybean flours.

15. The method according to claim 14 wherein a sufficient amount of water-solubles have been extracted and removed to provide a shredded product having at least 70% protein product solids.

16. The process according to claim 11 wherein the shredded fibers are substantially free from water-soluble constituents.

17. The method according to claim 1 wherein the hydrated extrudate pieces are characterized as having a structure consisting essentially of a plurality of distinct helicoid laminates predominantly aligned along the longitudinal axis of the extrudate, said laminates being separated by a plurality of reticulated pores and channels juxtaposed and oriented predominantly parallel to the planer surface of the helicoid laminates therein.

18. The method according to claim 17 wherein the water-soluble constituents are extracted in an amount sufficient to provide a shredded protein product having a protein content on a solids weight basis of at least 60%.

19. The method according to claim 17 wherein the extrudates have a solids composition consisting essentially of a heat-denatured, defatted soybean flour and the protein content of the texturized protein composition comprises from about 70 to about 85% of the total dry weight thereof.

20. The method according to claim 19 wherein the shredded protein product is substantially free from water-soluble constituents.

21. The shredded protein product prepared by the process of claim 11 wherein the protein of the fibers consists essentially of soya protein and a major portion of the fibers on a solids weight basis have a fiber length ranging from about 0.5 millimeters to about 300 millimeters.

22. The shredded protein product prepared by the process of claim 5 wherein a major portion of the fibers on a solids weight basis have a fiber length ranging from about 1 millimeter to about 100 millimeters and the fiber contains on a solids weight basis from about 70% to about 85% heat denatured protein.

23. The shredded protein product prepared by the process of claim 16 wherein a major portion of the fibers on a solids weight basis have a fiber length ranging from about 3 millimeters to about 25 millimeters.

24. The shredded protein product prepared in accordance with the process of claim 1.

25. The shredded protein product prepared in accordance with the process of claim 15.

* * * * *

UNITED STATES PATENT OFFICE
CERTIFICATE OF CORRECTION

PATENT NO. : 3,870,805
DATED : March 11, 1975
INVENTOR(S) : Lester P. Hayes, John W. Robinson, Ross P. Simms, and Millard E. Russell It is certified that error appears in the above-identified patent and that said Letters Patent are hereby corrected as shown below:

Column 2, line 24; for "of" read ---to---
Column 2, line 60; for "not suitable" read ---not a suitable---
Column 3, line 31; for "later" read ---lateral---
Column 5, line 29; for "consituents" read ---constituents---
Column 6, line 27; for "theral" read ---thereof---
Column 6, line 33; for "67%" read ---6%---
Column 6, line 39; for "soyben" read ---soybean---
Column 6, line 68; for "extrudate refers" read ---extrudate length refers---
Column 7, line 11; for "effeciency" read ---efficiency---
Column 8, line 13; for "consituents" read ---constituents---
Column 8, line 66; for "consituents" read ---constituents---
Column 9, line 9; for "orgnaoleptic" read ---organoleptic---
Column 9, line 49; for "advantageouslsy" read ---advantageously---
Column 9, line 58; for "mixtures and thereof" read ---mixtures thereof---
Column 11, line 20; for "laterally to" read ---laterally) to---
Column 11, line 64; for "bearing" read ---beating---
Column 13, line 49; for "conductive" read ---conducive---
Column 13, line 57; for "conected" read ---connected---
Column 15, line 4; for "teh" read ---the---
Column 15, line 6; for "throught" read ---through---
Column 15, line 54; for "dimeter" read ---diameter---
Column 19, line 33; for "mxture" read ---mixture---
Column 24, line 5; for "chucks" read ---chunks---
Column 24, line 7; for "apperance" read ---appearance---
Column 24, line 26; for "chucks" read ---chunks---
Column 28, line 2; for "70% protein product solids." read ---70% protein solids.---

Signed and Sealed this twenty-ninth Day of July 1975

[SEAL]

Attest:

RUTH C. MASON
Attesting Officer

C. MARSHALL DANN
Commissioner of Patents and Trademarks